United States Patent
Colebrooke

(10) Patent No.: US 10,385,805 B2
(45) Date of Patent: Aug. 20, 2019

(54) THRUST VECTORING NOZZLE

(71) Applicant: ROLLS-ROYCE plc, London (GB)

(72) Inventor: Jack F Colebrooke, Bristol (GB)

(73) Assignee: ROLLS-ROYCE plc, London (GB)

( * ) Notice: Subject to any disclaimer, the term of this patent is extended or adjusted under 35 U.S.C. 154(b) by 60 days.

(21) Appl. No.: 15/725,238

(22) Filed: Oct. 4, 2017

(65) Prior Publication Data

US 2018/0119641 A1 May 3, 2018

(30) Foreign Application Priority Data

Oct. 31, 2016 (GB) .................................. 1618339.4

(51) Int. Cl.
*F02K 1/70* (2006.01)
*F02K 1/06* (2006.01)
(Continued)

(52) U.S. Cl.
CPC ................ *F02K 1/70* (2013.01); *F02K 1/004* (2013.01); *F02K 1/1207* (2013.01); *F02K 1/1261* (2013.01); *F02K 1/06* (2013.01); *F02K 1/30* (2013.01); *F02K 9/80* (2013.01); *F05D 2220/90* (2013.01); *F05D 2250/90* (2013.01); *F05D 2260/50* (2013.01)

(58) Field of Classification Search
CPC ........ F02K 1/12; F02K 1/1207; F02K 1/1261; F02K 1/30; F02K 1/004; F02K 1/008; F02K 1/70; F02K 1/06; F02K 1/08; F02K 1/09; F02K 9/80
See application file for complete search history.

(56) References Cited

U.S. PATENT DOCUMENTS 3,429,509 A 2/1969 Markowski
4,994,660 A * 2/1991 Hauer .................... F02K 1/008
239/265.19
(Continued)

FOREIGN PATENT DOCUMENTS

GB 677188 A * 8/1952 ............... B27B 5/10
JP 2013-019330 A 1/2013

OTHER PUBLICATIONS

Mar. 14, 2018 Search Report issued in European Patent Application No. 17 19 4709.
(Continued)

Primary Examiner — William H Rodriguez
Assistant Examiner — Thomas P Burke
(74) Attorney, Agent, or Firm — Oliff PLC

(57) ABSTRACT

A variable geometry exhaust nozzle arrangement includes a plurality of hingable exhaust petals defining a perimeter of an exhaust duct and an annular ring slidably engagable against a radially outer surface of each petal. The annular ring is coupled to a plurality of circumferentially spaced actuator arrangements, each including first and second circumferentially spaced parallel actuator arms pivotably coupled to the annular ring at a first end and to a slide arrangement at a second end. Each slide arrangement is mounted for linear sliding movement relative to the annular ring, such that sliding movement of each slide arrangement causes pivoting of the first and second actuator arms to thereby translate the annular ring in one or both of a longitudinal direction and a lateral direction.

9 Claims, 5 Drawing Sheets

(51) Int. Cl.
*F02K 1/00* (2006.01)
*F02K 1/12* (2006.01)
F02K 9/80 (2006.01)
F02K 1/30 (2006.01)

(56) References Cited

U.S. PATENT DOCUMENTS

| | | | | |
|---|---|---|---|---|
| 5,174,502 | A | | 12/1992 | Lippmeier et al. |
| 5,238,189 | A | * | 8/1993 | Barcza ............... F02K 1/12 239/265.39 |
| 5,261,605 | A | | 11/1993 | McLafferty et al. |
| 5,267,436 | A | * | 12/1993 | Wood, Jr. ............ F02K 1/008 239/265.35 |
| 5,437,411 | A | * | 8/1995 | Renggli ............... F02K 1/008 239/265.39 |
| 6,142,416 | A | * | 11/2000 | Markstein ............ F02K 1/008 239/265.19 |
| 6,276,126 | B1 | | 8/2001 | Bouiller et al. |
| 2009/0266912 | A1 | | 10/2009 | Gukeisen |
| 2013/0206858 | A1 | * | 8/2013 | Werner ............... F02K 1/12 239/11 |
| 2015/0000305 | A1 | | 1/2015 | Jasklowski |

OTHER PUBLICATIONS

Ikaza, Daniel, "Thrust Vectoring Nozzle for Military Aircraft Engines," ICAS 2000 Congress, 2000, pp. 534.1-10.
May 10, 2017 Search Report issued in British Patent Application No. 1618339.4.

\* cited by examiner

THRUST VECTORING NOZZLE

The present disclosure concerns a nozzle such as a gas turbine engine nozzle which can provide thrust vectoring in flight.

In order to increase aircraft maneuverability, it is known to provide aircraft having vectorable exhaust nozzles, so that exhaust from the engine can be directed in a desired direction. Prior designs are known which comprise a plurality of hinged petals, positioned by a series of linkages. The linkages are in turn mounted to a gimballed ring, controlled by actuators. Such an arrangement is sometimes referred to as an "iris" design, and may permit both thrust vectoring and exhaust nozzle area adjustment. An example prior design is disclosed in U.S. Pat. No. 4,994,660. Vectoring nozzles are also known for directing aircraft exhausts for providing vertical/short takeoff and landing (V/STOL). An example prior V/STOL vectoring nozzle is described in U.S. Pat. No. 3,429,509, which uses a three-bearing swivel nozzle.

Prior "petal" type vectorable exhaust nozzles controlled by a gimballing ring allow gaps to form between petals during movement, since the linkage arrangement is unable to evenly distribute the petals. Some designs use an additional link to reduce this effect. However, significant petal gaps still form. On the other hand, three-bearing swivel nozzles can provide for exhaust vectoring, but separate provision must be made for exhaust nozzle area modulation, and vectoring can only generally be provided for in one axis.

Similar considerations apply for pump jets, where smaller nozzle areas are desirable to provide for high acceleration and larger areas for efficient cruising, while thrust vectoring is desirable to provide steering. Again, conventional vectorable designs may suffer from similar disadvantages as the above jet engine nozzle designs.

Where gaps form in the nozzle, additional cooling air is required, reducing the performance of the engine. In addition the nozzle has greater losses and is less effective.

According to a first aspect there is provided a variable geometry exhaust nozzle arrangement comprising:
 a plurality of hingable exhaust petals defining a perimeter of an exhaust duct;
 an annular ring slidably engagable against a radially outer surface of each petal;
 the annular ring being coupled to a plurality of circumferentially spaced actuator assemblies;
 each actuator arrangement comprising first and second circumferentially spaced parallel actuator arms pivotably coupled to the annular ring at a first end and to a slide arrangement at a second end;
 each slide arrangement being mounted for linear sliding movement relative to the annular ring, such that sliding movement of each slide arrangement causes pivoting of the first and second actuator arms to thereby translate the annular ring in one or both of a longitudinal direction and a lateral direction.

Advantageously, the arrangement of the present disclosure provides for both variable exhaust area and variable exhaust vectoring by translating the annular ring in a longitudinal direction and a lateral direction respectively. Since the ring is mounted for substantially translating movement only (and not gimballing movement), gaps are not formed between the petals at any exhaust nozzle position, thereby reducing the requirement for cooling air, and increasing propulsive performance. Furthermore, fewer petals may be required in view of the relatively constant gap/overlap between petals at different nozzle positions, thereby reducing weight, complexity, part count and cost.

The exhaust nozzle arrangement may comprise two actuator assemblies spaced approximately 180° from one another. Such an arrangement provides for both exhaust nozzle area adjustment and thrust vector control in one axis. The nozzle may comprise three or more actuator assemblies. Such an arrangement provides for both exhaust nozzle area adjustment and thrust vector control in two axes.

Each slide arrangement may be independently actuable by a respective actuator. Each actuator arrangement may comprise one or more of a linear motor, hydraulic actuator and pneumatic actuator.

The annular ring may be slidably mounted to one of a convergent portion and a divergent portion of the exhaust duct.

The lengths of the first actuator arms may be substantially equal to one another.

The exhaust nozzle arrangement may be mounted to one of a gas turbine engine and a pump jet.

According to a second aspect of the disclosure there is provided an aircraft gas turbine engine comprising an exhaust nozzle arrangement in accordance with the first aspect.

According to a third aspect of the disclosure there is provided a pump jet comprising an exhaust nozzle arrangement in accordance with the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
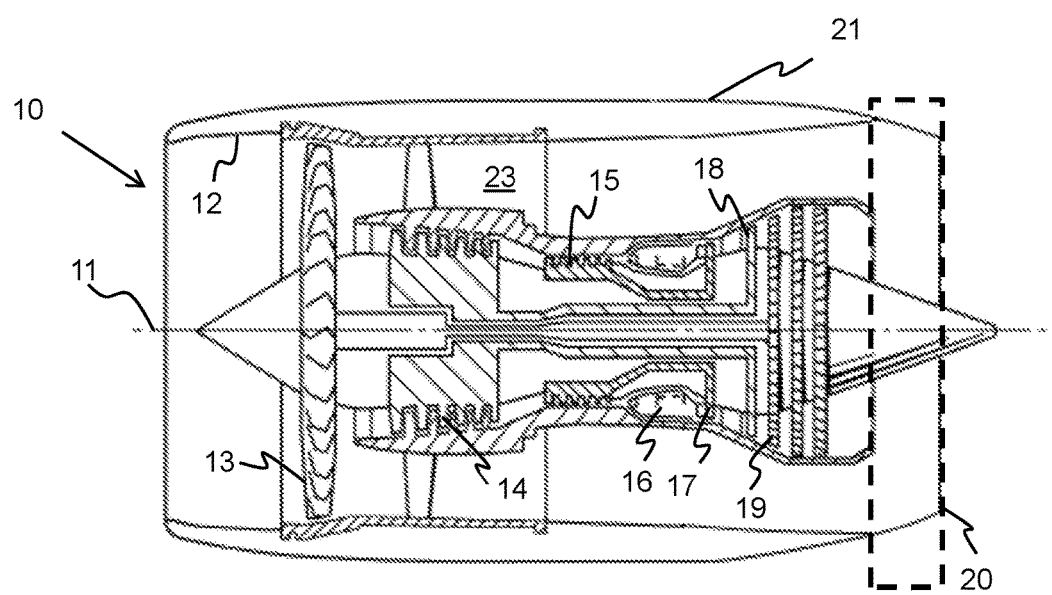
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle arrangement 20. A nacelle 21 generally surrounds the engine 10 and defines both the intake 12 and the exhaust nozzle arrangement 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 23 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle arrangement 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Figure 2:
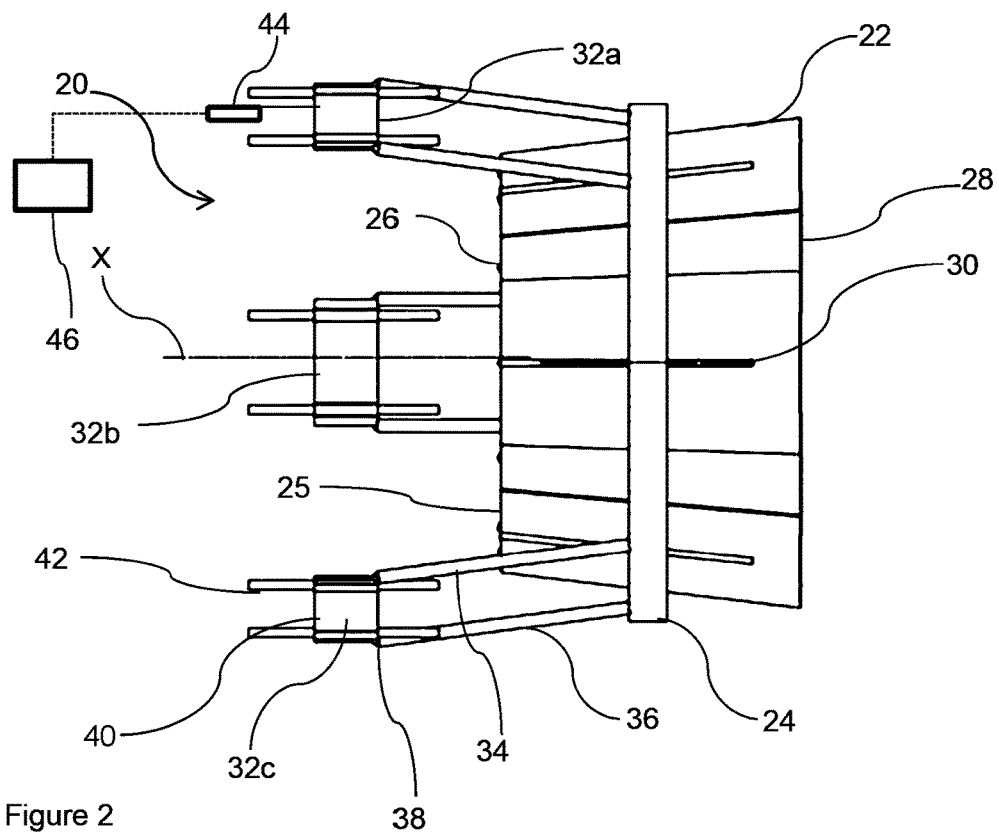
FIG. 2 is a side view of a variable geometry exhaust nozzle of the gas turbine engine of FIG. 1 in a first position.
Figure 3:
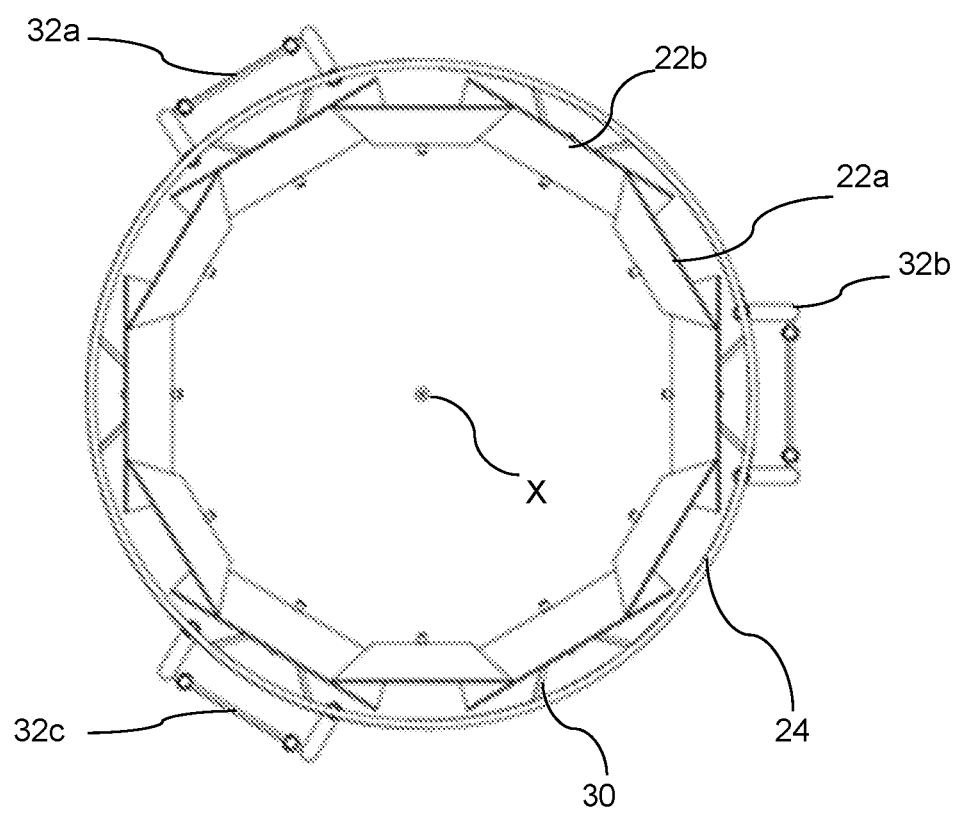
FIG. 3 is a rear view of the variable geometry exhaust nozzle of FIG. 2.

The nozzle arrangement 20 is shown in more detail in a first position in FIGS. 2 and 3. The arrangement comprises a plurality of petals 22, which project in a generally longitudinal direction X to define the perimeter of an annular duct through which gas turbine exhaust flows in use. Each petal 22 overlaps slightly with an adjacent petal 22 in order to minimise gaps therebetween, whilst permitting relative movement. The petals 22 comprise radially inner "slave" petals 22a, and radially outer "master" petals 22b. The outer petals 22b overlap adjacent inner petals 22a, with the inner and outer petals 22a, 22b being arranged in an alternating fashion. Only the outer master petals are directly mounted to the ring 24 by the guide rails 30, such that movement of the outer petals 22b drives movement of the inner petals 22a, while allowing sliding movement therebetween.

Each petal is mounted by a hinge 25 at an upstream 26 end, which permits each petal to pivot about a generally circumferential axis, such that a downstream end 28 of each petal is moveable in a generally radial direction. Typically, each petal widens in a generally circumferential direction from an upstream to a downstream end. Upstream of the hinge 25 may be a convergent nozzle section (not shown), which is configured to accelerate gas turbine engine exhaust to sonic or supersonic speeds. The petals are provided at a downstream end of the engine, such that exhaust flows out of the duct defined by the petals to ambient air. Therefore it will be understood that the positioning of the petals 22 will define both the duct final area, and the vector of thrust exiting the nozzle 20, and therefore will define the expansion ratio of the nozzle, and the thrust vector.

The nozzle arrangement 20 further comprises an annular ring 24 provided annularly outward of, and surrounding the petals 22. A diameter of the ring 24 extends in a direction parallel to a radial plane of the engine, i.e. normal to the longitudinal axis X. The ring 24 in this embodiment has a larger inner diameter than the outer diameter of the upstream end 26 of the duct. It will be understood however that embodiments in which the ring 24 has a smaller diameter than the upstream end of the duct are envisaged.

The annular ring 24 slidably engages against an outer surface of at least a subset of the petals 22, and in this case to the radially outer petals 22. In this embodiment, the ring 24 pivotably and slidably engages with each petal 22 by a guide rail 30, such that the ring 24 can move in a direction generally parallel to the engine longitudinal axis X, with the petals being urged inwardly by longitudinal movement of the ring 24, and outwardly by duct pressure. Other mounting arrangements could be envisaged, provided that longitudinal translation of the ring 24 causes radial movement of the petals 22. Since the inner diameter of the ring 24 is greater than the outer diameter of the duct at the upstream end 26, axial translation in a downstream direction causes the petals to move inwardly, thereby reducing nozzle final area, while axial translation in an upstream direction causes the petals to move radially outwardly, thereby increasing nozzle final area.

The annular ring 24 is translatable by a plurality of (three in this embodiment) actuator arrangements 32a, 32b, 32c.

Each actuator arrangement 32a-c comprises first and second circumferentially spaced actuator arms 34, 36, which are pivotably mounted at a first, downstream end to the ring 24, and at a second, upstream end to a slide arrangement 38 at an upstream end. Each of the arms 34, 36 is mounted with fixed spacing between the first and second arms 34, 36, that each of the arms 34, 36 are parallel to the other of that arrangement 32a-c, such that the arms 34, 36 pivot in unison. Each of the arms 34, 36 of each actuator arrangement 32a-c is also of the same length.

The slide arrangement 38 comprises a shuttle 40 slidably mounted to one or more rails 42. The rails are generally parallel to the engine longitudinal axis X, such that the shuttle 40 is slidably moveable along the axis X. One or more hydraulic actuators 44 are provided for axially moving a respective shuttle 40 in the axial direction X (only one of which is shown for clarity). Each hydraulic actuator 44 is controlled by a controller 46, which can provide for independent or collective actuation of the actuators 44, as will be described in further detail below.

Figure 5:
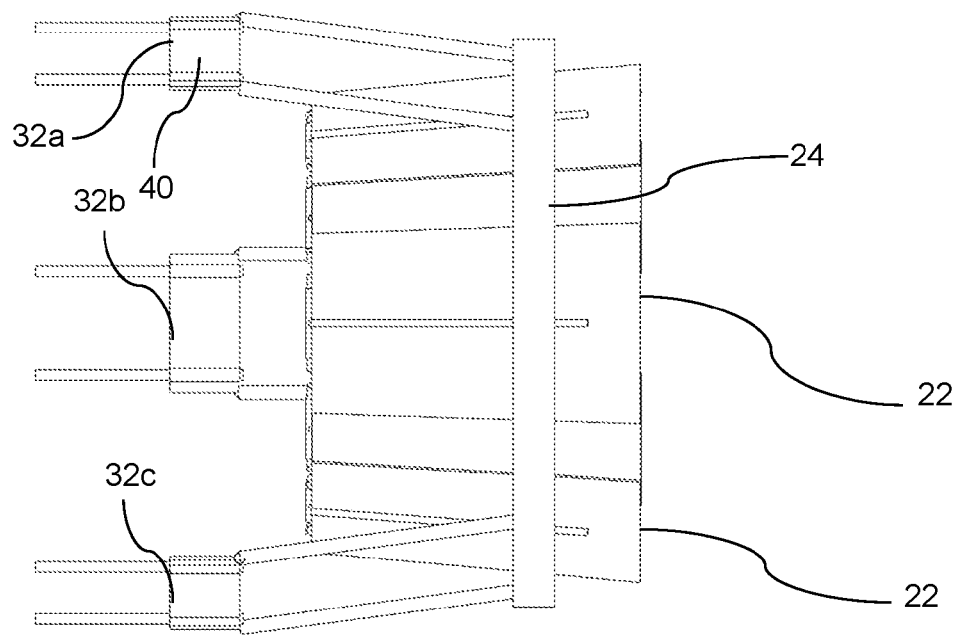
FIG. 5 is a side view of the variable geometry exhaust nozzle of FIG. 2 in a second position.

FIG. 5 shows the nozzle arrangement 20 in a second position. The shuttles 40 of the actuator arrangements 32a-c have been urged axially rearwardly (i.e. in a downstream direction) from their positions shown in FIG. 2. The longitudinal distance each shuttle 40 has been moved between the first and second positions is substantially equal, and so the actuator arrangements 32a-c can be said to have been moved collectively or synchronously. As a consequence, each of the pairs of actuator arms 34, 36 is moved axially, whilst also pivoting relative to the shuttle and the ring 24, to maintain their parallelism. Consequently, the ring 24 is slid rearwardly along the rails 30 in the downstream direction, while maintaining the same orientation (i.e. the ring 24 does not tilt/pivot/gimbal away from a radial plane). In view of the smaller inner diameter of the ring 24 relative to the upstream end 26 of the petals 22, and the engagement of the ring 24 against the petals 22, the downstream end of the petals are urged inwardly, thereby reducing the divergence of the duct, and so the final area of the nozzle 20. Since the ring 24 maintains its radial orientation, the petals 22 are each urged inwardly to the same extent, such that gaps do not appear between the petals in either the first or second position.

Figure 6:
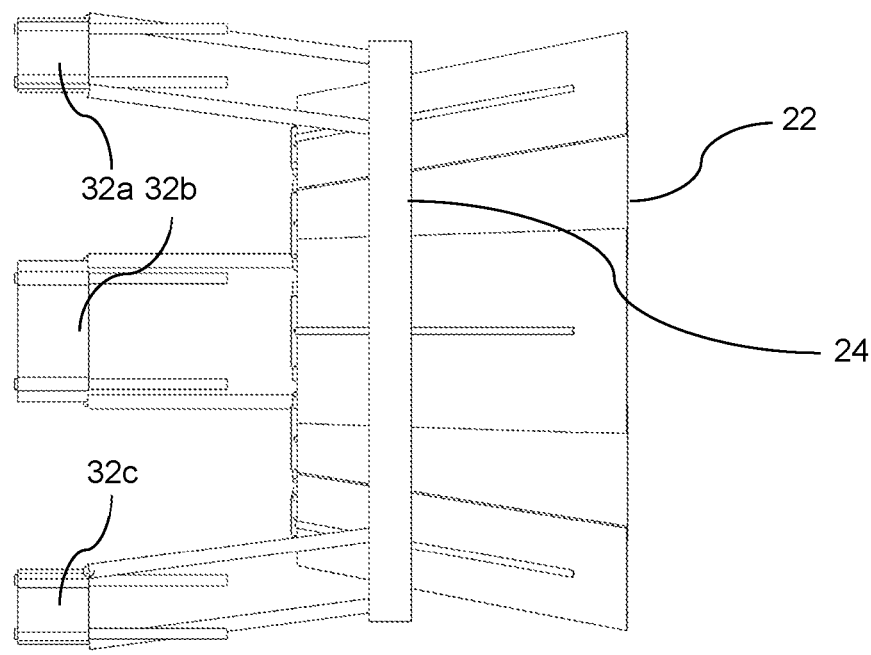
FIG. 6 is a side view of the variable geometry exhaust nozzle of FIG. 2 in a third position.

Similarly, FIG. 6 shows the nozzle arrangement in a third position, in which the shuttles 40 of the actuator arrangements 32a-c have been urged axially rearwardly (i.e. in a downstream direction) from their positions shown in FIG. 2. In this case, the ring 24 is moved axially forwardly, thereby urging the petals 22 outwardly, to increase the divergence of the nozzle, and so increase the final area.

Figure 4:
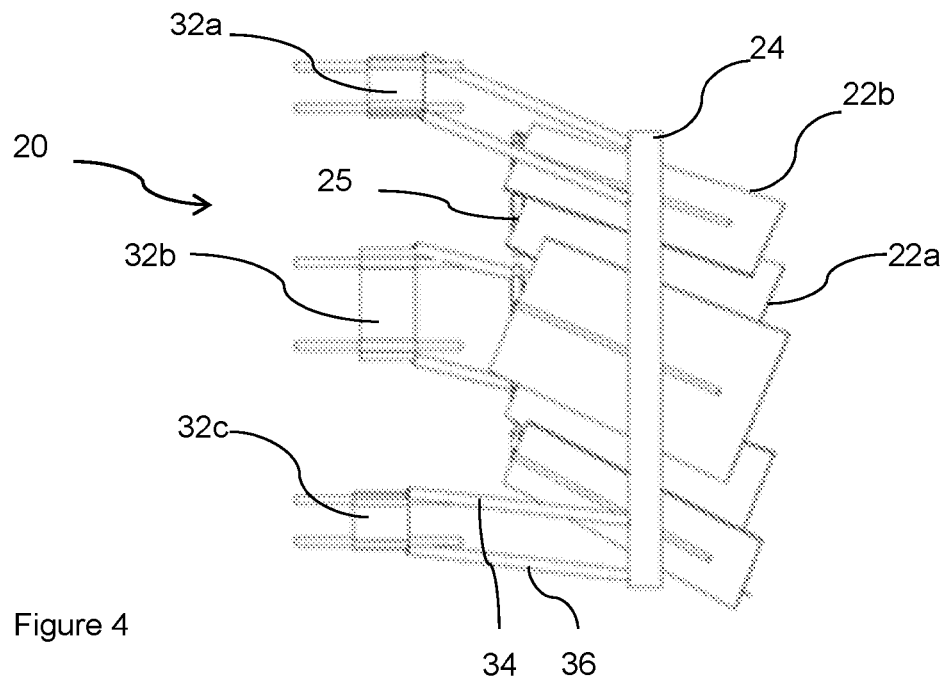
FIG. 4 is a side view the variable geometry exhaust nozzle of FIG. 2 in a fourth position.

FIG. 4 shows the nozzle arrangement 20 in a fourth position corresponding to a downward vectored thrust nozzle position. In this position, the petals 22 are oriented toward the ground when the aircraft is in level flight, to provide either a downward pitching moment, or to increase lift to assist with takeoff.

In moving the nozzle arrangement 20 from the first position to the fourth position, the controller 46 controls each of the actuator arrangement 32a-c independently, i.e. asynchronously. In this case, the actuator arrangement 32a closest to top dead centre of the engine is moved rearwardly parallel to the longitudinal direction X. The actuator arrangement 32b located at a mid-location is moved rearwardly to a lesser extent. The actuator arrangement 32c is moved forwardly somewhat, then rearwardly, though to a less extent than the actuator arrangement 32a. Consequently, the arms 34, 36 the upstream end of the first and second arms 34, 36 of the first actuator arrangement 32a are moved axially rearwardly, and are pivoted, whereas the downstream ends are pivoted relative to the ring 24, while staying the same axial position. Similarly, the arms 32, 34 of the other actuator arrangements move in a similar fashion, with their downstream ends pivoting and moving downwardly, whilst remaining in the same longitudinal position. Consequently, the ring 24 is moved downwardly in a direction normal to the engine longitudinal axis X, whilst again remaining in the same orientation, such that the centre of the ring 24 is no longer coaxial with the centerline of the engine 10.

Since the petals 22 are pivotably mounted to the ring 24 at a point downstream of the hinges, the petals 22 are pivoted about their respective hinges 26, and so re-oriented in a downward direction by the lateral movement of the ring 24. Consequently, thrust from the nozzle 20 is vectored downwardly in the fourth position.

Since the ring 24 moves laterally while maintaining an orientation in a radial plane, the petals 22 are moved evenly. Consequently, gaps between the petals 22 do not open up when the nozzle is moved from the first to the third position. It will be understood that the nozzle 20 can be moved to an upward thrust vectoring position in a similar manner, or in a port or starboard orientation using differential movement of the actuator arrangements 32a-c. Similarly, the actuators 32a-c can be moved both collectively and differentially to both adjust the final area and the nozzle vector simultaneously.

Figure 7:
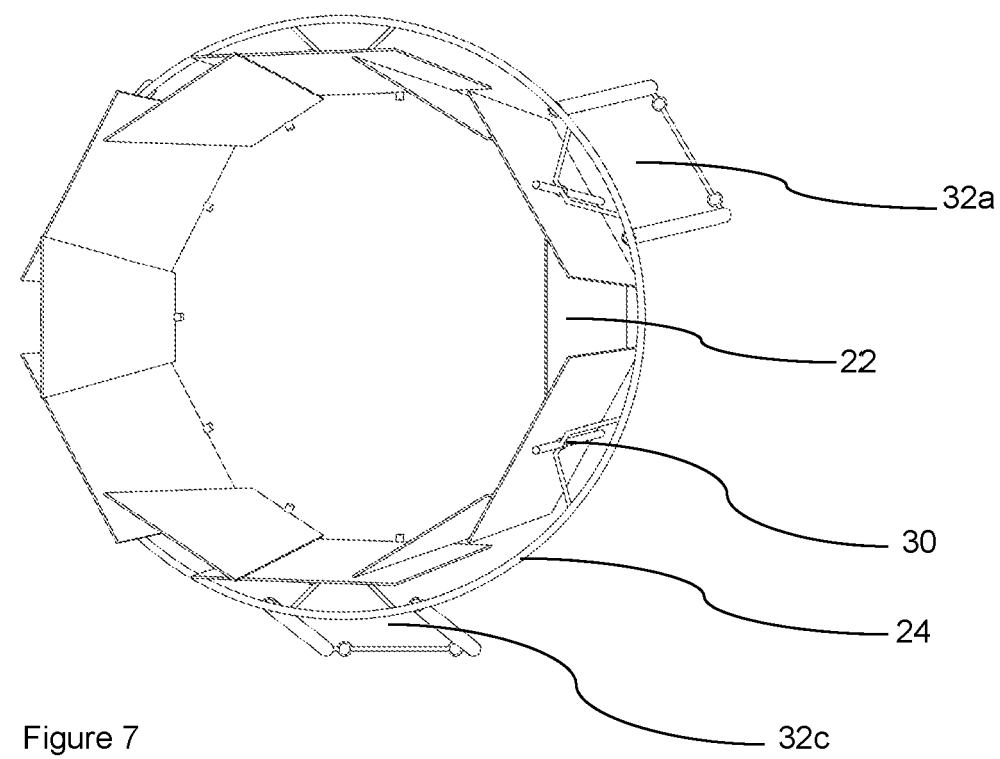
FIG. 7 is a rear view of the variable geometry exhaust nozzle of FIG. 2 in a fifth position.

Similarly, FIG. 7 shows the nozzle arrangement 20 in a fifth position corresponding to a laterally vectored thrust nozzle position. In this position, the petals 22 are oriented toward the port side when the aircraft is in level flight, to provide either a lateral force to assist with aircraft maneuvers, by providing a yaw moment.

Again, the actuator arrangements 32a-c are moved asynchronously, with the shuttle 40 of the second actuator arrangement 32b being moved forward, while the shuttles of the first and third actuator arrangements are moved rearward. Consequently, the centre of the ring 24 is moved to one side of the engine longitudinal axis, thereby vectoring the thrust to one side, off the engine axis. It will be understood that similar movement in the opposite direction will provide yawing in the opposite direction. Similarly, it will be understood that a combination of these movements can provide both final area adjustment and nozzle vector adjustment simultaneously.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan. Similarly, the fan may be omitted, with all flow passing through the compressors. Such an arrangement is known as a "turbojet". Alternatively, the engine may comprise a "low bypass" turbofan, comprising a multi-stage, high pressure ratio fan, which passes a greater portion of flow to the compressors than in the case of a high bypass ratio, single stage fan design.

As a further example, the actuators may be hydraulically, electrically, or pneumatically driven.

The invention claimed is:

1. A variable geometry exhaust nozzle arrangement comprising:
    a plurality of hingeable exhaust petals defining a perimeter of an exhaust duct;
    an annular ring slidably engagable against a radially outer surface of each petal;
    the annular ring being coupled to a plurality of circumferentially spaced actuator assemblies, the annular ring configured to move laterally with respect to a central longitudinal axis of a gas turbine engine having the nozzle arrangement disposed therein while maintaining an orientation in a radial plane;
    each actuator assembly comprising a pair of actuator arms including a first actuator arm and a second actuator arm, each first actuator arm and second actuator arm of the respective pair being circumferentially spaced from and oriented parallel to each other and being pivotably coupled to the annular ring at a first end and to a slide arrangement at a second end, each pair of the first actuator arm and second actuator arm having a fixed axial spacing and maintaining the parallel orientation when moved axially;
    each slide arrangement being mounted for linear sliding movement relative to the annular ring, such that sliding movement of each slide arrangement causes pivoting of each pair of the first and second actuator arms to thereby translate the annular ring in one or both of a longitudinal direction and a lateral direction.

2. An arrangement according to claim 1, comprising two actuator assemblies spaced approximately 180° from one another.

3. An arrangement according to claim 2, comprising three or more actuator assemblies.

4. An arrangement according to claim 1, wherein each slide arrangement is independently actuable by a respective actuator.

5. An arrangement according to claim 1, wherein each actuator arrangement comprises one or more of a linear motor, hydraulic actuator and pneumatic actuator.

6. An arrangement according to claim 1, wherein the annular ring is slidably mounted to one of a convergent portion and a divergent portion of the exhaust duct.

7. An arrangement according to claim 1, wherein lengths of the first actuator arms may be substantially equal to one another.

8. An arrangement according to claim 1, wherein the variable geometry exhaust nozzle arrangement is mounted to a gas turbine engine.

9. An aircraft gas turbine engine comprising an exhaust nozzle arrangement in accordance with claim 1.

* * * * *